Patented June 2, 1953

2,640,836

UNITED STATES PATENT OFFICE 2,640,836

PROCESS FOR PRODUCING PECHMANN DYE

Werner Bergmann, New Haven, Conn., assignor to American Cyanamid Company, New York, N. Y., a corporation of Maine No Drawing. Application October 16, 1951, Serial No. 251,619. In Canada April 5, 1951

14 Claims. (Cl. 260—343.6)

1

The present invention relates to an improved process of producing the red coloring matter known to chemists as the "Pechmann dye" and derivatives.

In 1882, von Pechmann (Ber. 15, 881–892) obtained a red dye when he heated beta-benzoylacrylic acid in acetic anhydride. The generally accepted structure of the dyestuff is as follows:

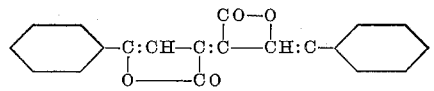

It has not been possible, up to the present time, to determine the formula of the dye with complete certainty, but the generally accepted formulation is the only one explaining its properties and formation from two molecules of beta-benzoylacrylic acid with the elimination of two molecules of water.

Despite the desirable technical properties of the Pechmann dye, it has achieved no practical utility, because the yields are low and are so erratic as to preclude economic production. While Pechmann reported a yield of 45% in the most favorable case, no worker since him has ever obtained yields of such magnitude. Modern work (1934) resulted in yields from 5–7% (Dufraisse and Chovin, Bull. Soc. Chim. (5), 1,781) and applicants have never been able to obtain yields of more than 10%, and this only occasionally, when following the Pechmann process.

According to the present invention, excellent yields, with are reproducible and which reach as high as 80% and over, are obtained when the reaction is carried out in the presence of a condensing agent comprising a cupriferous compound, such as metallic copper, or cuprous or cupric salts, such as the chloride, bromide, sulfate, acetate, iodide, cyanide and tartrate and an acid of boron, such as orthoboric acid, pyroboric acid or boric anhydride. Because of their ready availability, and excellent results, the chlorides of copper are preferred.

It is not known whether the copper compounds and the acids of boron react to form complexes; and the invention is not intended to be limited to any theory of operation or any reaction mechanism.

It is an advantage of the present invention that no special techniques are required in its practice. The heating takes place in a recation medium comprising a lower aliphatic acid anhydride, such as acetic, propionic, butyric and the like. Because of its cheapness, and excellent results, acetic anhydride is preferred. The Pechmann dye, produced, separates out in a crystalline state and can be recovered by filtration and, if desired, purified by extraction or recrystallization.

The present invention is not limited to the preparation of Pechmann's dye from benzoylacrylic acid, but includes also derivatives in which the ring of the benzoyl radical may be substituted by substituents such as nitro, halogen, aryl, alkyl, ethoxy, etc.

It is another feature of the present invention that it is not necessary to use pre-formed benzoylacrylic acid in the reaction. On the contrary, it is possible to replace this compound with a material such as beta-benzoyllactic acid, which is capable of forming benzoylacrylic acid under the conditions of reaction. Here again, it is not known with certainty just how the reaction proceeds and, hence, it is not desired to limit the invention to any theory. However, it seems probable that the dehydration of the benzoyllactic acid to benzoylacrylic acid may well be the first step in the reaction.

The invention will be described in greater detail in the following specific examples. All parts are by weight unless otherwise specified.

Example 1

A mixture of 50 parts of beta-benzoylacrylic acid, 10.0 parts of cuprous chloride and 36 parts of orthoboric acid is refluxed in 33 parts of acetic anhydride until the reaction is complete. The mixture is then cooled and filtered. The product is washed with acetic acid, followed by alcohol and water and is dried at 110° C. It is purified by extraction with toluene, followed by recrystallization from xylene. The yield of purified Pechmann dye is about 80% of theoretical. If the cuprous chloride and boric acid are omitted, the yield is of the order of 10%. If only the boric acid is used, the yield is only slightly higher than 10%.

Results are similar if propionic or butyric anhydride are used as solvent instead of acetic anhydride.

Example 2

A mixture of 50 parts of benzolyacrylic acid, 10.0 parts of cuprous chloride and 12.0 parts of orthoboric acid is refluxed in 270 parts of acetic anhydride until the reaction is complete. The mixture is worked up as described in the preceding example. The yield of purified Pechmann dye is 80–85%. Similar results are obtained if the benzoylacrylic acid is replaced by beta-benzoyllactic acid.

Example 3

The procedure of Example 2 is followed, replacing the cuprous chloride by 6.0 parts of copper powder. A yield of Pechmann dye is obtained, which is again very much higher than the yield obtained in the absence of catalyst.

Example 4

A mixture of 6.0 parts of powdered copper, 7.0 parts of boric anhydride and 50 parts of beta-benzoylacrylic acid in 270 parts of acetic anhydride is refluxed until the reaction is complete. On working up in the usual manner, a yield of 55-60% of purified Pechmann dye is obtained.

Similar results are obtained if the powdered copper is replaced by 10 parts of cupric chloride.

Example 5

A mixture of 50.0 parts of beta-p-anisoylacrylic acid, 10.0 parts of cuprous chloride, 7.0 parts of boric anhydride, and 270 parts of acetic anhydride is refluxed until reaction is complete, cooled, and filtered. Additional product may be obtained by diluting the filtrate with water. The product may be purified by extraction with toluene. The yield of reddish-brown product is approximately 80% of theoretical.

If the cuprous chloride and boric anhydride are omitted, the yield of product is very much less.

Example 6

The preceding example is repeated, replacing the boric anhydride by 12.0 parts of boric acid. The results are similar.

Example 7

A mixture of 20.0 parts of beta-p-phenyl-benzoylacrylic acid, 10.0 parts of cuprous chloride, 10.0 parts of boric anhydride, and 215 parts of acetic anhydride is refluxed until reaction is complete and worked up as described in the preceding examples. A good yield of the corresponding Pechmann dye is obtained, as a red crystalline solid.

In the absence of the cuprous chloride and boric anhydride, very little product is obtained.

Example 8

The procedure described in Example 4 is followed, using instead p-toluylacrylic acid as starting material. Results are similar.

Example 9

This is prepared by the procedure described in Example 7 for the 4,4'-diphenyl derivative, the starting material being replaced by an equal weight of p-bromobenzoylacrylic acid. Results are similar.

This application is in part a continuation of my co-pending application, Serial No. 198,910, filed December 2, 1950, now abandoned.

I claim:

1. A process of preparing the "Pechmann dye" which comprises heating a substance selected from the class consisting of para-substituted and unsubstituted beta-benzoylacrylic acids and beta-benzoyllactic acids in a reaction medium comprising a lower aliphatic acid anhydride in the presence of a condensing agent comprising a cupriferous substance and a boric acid compound.

2. A process of preparing the "Pechmann dye" which comprises heating a beta-benzoylacrylic acid in a reaction medium comprising a lower aliphatic acid anhydride in the presence of a condensing agent comprising a cupriferous substance and a boric acid compound.

3. A process of preparing the "Pechmann dye" which comprises heating a substance selected from the class consisting of unsubstituted beta-benzoylacrylic acid and beta-benzoyllactic acid in a reaction medium comprising a lower aliphatic acid anhydride in the presence of a condensing agent comprising a cupriferous substance and a boric acid compound.

4. A process of preparing the "Pechmann dye" which comprises heating beta-benzoylacrylic acid in a reaction medium comprising a lower aliphatic acid anhydride in the presence of a condensing agent comprising a cupriferous substance and a boric acid compound.

5. A process according to claim 4 in which the anhydride is acetic anhydride.

6. A process according to claim 5 in which the boric acid is orthoboric acid.

7. A process according to claim 6 in which the cupriferous substance is metallic copper.

8. A process according to claim 4 in which the cupriferous substance is a copper salt and the boron acid is orthoboric acid.

9. A process according to claim 8 in which the copper salt is a copper chloride.

10. A process according to claim 4 in which the boric acid compound is boric acid anhydride.

11. A process according to claim 10 in which the cupriferous substance is metallic copper.

12. A process according to claim 4 in which the cupriferous substance is a copper salt and the boron acid is boric acid anhydride.

13. A process according to claim 12 in which the copper salt is a copper chloride.

14. A process according to claim 3 in which the aliphatic acid anhydride is acetic anhydride.

WERNER BERGMANN.

No references cited.